United States Patent [19]

Goldstein

[11] Patent Number: 4,500,375
[45] Date of Patent: Feb. 19, 1985

[54] COLD RECAPPING METHOD FOR TIRES UTILIZING UNCURED RUBBER

[75] Inventor: Leon C. Goldstein, Atlanta, Ga.

[73] Assignee: An-Rix, Inc., Atlanta, Ga.

[21] Appl. No.: 361,403

[22] Filed: Mar. 24, 1982

[51] Int. Cl.³ .................. B29H 17/37; B29H 5/04; B29H 17/36

[52] U.S. Cl. .................. 156/96; 156/128.1; 156/128.6; 156/130.3; 156/130.5; 156/909; 156/395; 156/406.4; 425/20; 425/28 D; 425/39; 425/46; 425/DIG. 44; 264/36; 264/502; 264/220; 264/225; 264/227; 264/326; 264/315

[58] Field of Search .................. 156/95–96, 156/110.1, 128.1, 128.6, 130.3, 130.5, 130.7, 909, 395, 406.4; 425/20, 28 D, 39, 46, DIG. 44; 264/36, 501–502, 220, 225–227, 326, 315

[56] References Cited

U.S. PATENT DOCUMENTS

| | | | |
|---|---|---|---|
| 2,014,010 | 9/1935 | Wheatley | 264/36 |
| 2,094,511 | 9/1937 | Welch | 18/6 |
| 2,421,099 | 5/1947 | Vogt | 264/36 |
| 2,966,936 | 1/1961 | Schelkmann | 156/96 |
| 3,207,647 | 9/1965 | Schelkmann | 156/394 |
| 3,224,481 | 12/1965 | Lugli | 152/361 DM |
| 3,236,709 | 2/1966 | Carver | 156/96 |
| 3,325,326 | 6/1967 | Schelkmann | 156/96 |
| 3,503,432 | 3/1970 | Maiocchi | 152/361 DM |
| 3,752,726 | 8/1973 | Barefoot | 156/96 |
| 3,769,121 | 10/1973 | Martin | 156/96 |
| 3,779,830 | 12/1973 | Reppel | 156/96 |
| 3,779,831 | 12/1973 | Reppel | 156/96 |
| 3,779,832 | 12/1973 | Reppel | 156/96 |
| 3,779,833 | 12/1973 | Reppel | 156/96 |
| 3,884,739 | 5/1975 | Hindin et al. | 156/96 |
| 3,917,440 | 11/1975 | Huebert | 425/18 |
| 3,983,193 | 9/1976 | Wulker et al. | 264/36 |
| 3,989,428 | 11/1976 | Cox | 425/18 |
| 4,053,265 | 10/1977 | Wulker et al. | 425/20 |
| 4,090,901 | 5/1978 | Baatz | 156/96 |
| 4,115,171 | 9/1978 | Dundon | 156/96 |
| 4,185,056 | 1/1980 | Detwiler | 264/36 |
| 4,269,644 | 5/1981 | Goldstein | 156/96 |

FOREIGN PATENT DOCUMENTS

| | | |
|---|---|---|
| 1035891 | 8/1958 | Fed. Rep. of Germany . |
| 199580 | 11/1965 | Sweden . |
| 340524 | 11/1971 | Sweden . |
| 371136 | 11/1974 | Sweden . |
| 555680 | 9/1943 | United Kingdom . |
| 555689 | 9/1943 | United Kingdom . |
| 555690 | 9/1943 | United Kingdom . |

Primary Examiner—Lois E. Boland
Attorney, Agent, or Firm—Kilpatrick & Cody

[57] ABSTRACT

An apparatus and method for cold retreading of the running surface of a vehicle tire. A rubber and cloth mold is produced utilizing a new tire male mold covered with perforated polyethylene film, uncured rubber and highly stretchable cloth enclosed in an envelope and cured by application of pressure and heat. The somewhat flexible female mold thus produced is then utilized in recapping tires by positioning it around a prepared tire carcass coated with cement, a layer of uncured rubber, and a sheet of perforated polyethylene film. The mold and tire assembly is then enclosed in an envelope, and like assemblies are placed in a chamber where curing of the rubber layer is accomplished by inflation of the tire carcass, evacuation of the envelope, pressurization of the chamber and application of heat.

11 Claims, 5 Drawing Figures

COLD RECAPPING METHOD FOR TIRES UTILIZING UNCURED RUBBER

BACKGROUND OF THE INVENTION

The invention relates generally to an improved method for retreading the running surface of a vehicle tire, and more particularly to a novel method for producing a rubber and cloth tread mold and utilizing that tread mold around a buffed tire carcass covered with uncured rubber to accomplish retreading.

Heretofore, various methods have been employed for retreading vehicle tires. Commonly, worn tires are recapped by the warm vulcanization method, wherein an uncured tread cover or "camel-back" is applied to the buffed crown surface of the previously cured tire casing or carcass and the assembly is vulcanized at an elevated temperature in a suitable mold. A major disadvantage of this type of retread is that the fixed mold requires stretching and expansion of the tire during retreading because the tire must be smaller than the mold to insert it in the mold. Steel radial tires do not stretch; thus, mold size is critical, and numerous molds are necessary to accommodate the various steel radial tire dimensions. Any deformation or distortion of the tire casing during the curing operation will tend to subsequently rupture or materially weaken the vulcanized bond between the cured "camel-back" and the crown surface of the tire after it is removed from the vulcanizing mold. In addition, the elevated vulcanizing temperature tends to weaken and deteriorate the previously cured tire casing.

The prior art has sought to overcome shortcomings in the warm vulcanization recapping method by various "cold" recapping methods utilizing both precured rubber treads and uncured rubber. One approach to cold recapping is disclosed in my U.S. Pat. No. 4,269,644, which involves a cold tire recapping method utilizing a precured tread strip and a rubber bonding composition between the strip and the prepared tire carcass.

There are disadvantages associated with utilization of such previously manufactured precured rubber tread material, including the cost of that material as compared to the cost of uncured rubber, the need to maintain a large inventory of widths and tread designs, the difficulty of producing a tire having good physical appearance at the transition of tread and sidewall and the difficulty of retreading traction tires with deep sidewall voids.

A different recapping approach is disclosed in the U.S. Pat. No. 4,185,056 to Detwiler, which discloses the formation of a rubber mold and utilization of that mold together with uncured rubber to retread the prepared tire carcass. The patent to Detwiler discloses formation of the tread mold by utilizing a new mold tire which is coated with a mold release and then covered with a very loosely woven "fabric" network of strands, the transverse strands of which are intended to serve as air venting conduits during the curing operation. Such transverse strands become embedded in the cured female mold and thereafter serve little or no function during recapping utilizing the mold but weaken the tread-forming portion of the rubber mold.

Failure to provide a structure and/or method which effectively purges air and gases at the interface between the tread mold and the new tread during recapping causes excessive porosity within the new tread, which creates accelerated wear and tread to tire carcass bonding problems. Furthermore, utilization of transverse strands which become embedded in the mold results in limited mold life because the exposed rubber mold surface does not wear well, and tread groove-forming protrusions in the female retread mold tend to break off during use.

Additional limitations inherent in the prior art rubber molds and methods for recapping with uncured rubber typified by the patent to Detwiler U.S. Pat. No. 4,185,056 include problems in fully seating the mold during recapping and difficulties in removing the mold after curing of the recap tread is complete. Seating problems occur because of sealing contact between the carcass sidewalls and the sidewall-forming portion of the rubber mold which will not easily slide along the carcass sidewall and thereby permit the entire tread-forming portion of the mold to seat in the uncured rubber as the recap tread is formed. A typical prior art approach to this problem involves repeated pressurization and evacuation of the envelope enclosing the carcass and mold during the curing cycle in an effort to "work" the mold into its fully seated position. This practice is inconsistent, however, with the need to maintain constant pressure during the early stage of recap curing in order to achieve optimum curing results.

Problems is removal of the female mold from the cured recapped tire reduce production efficiency and frequently result in damage to the newly recapped tire and/or the mold.

SUMMARY OF THE INVENTION

The tire recapping method and apparatus of the present invention involve preparation of a rubber and cloth tread mold utilizing a new mold tire. A layer of uncured rubber is built up on the mold tire tread and then removed. The mold tire tread is then covered with thin perforated polyethylene film, a rectangle of highly stretchable synthetic cloth is positioned on top of the polyethylene film, and the uncured rubber is repositioned around the mold tire on top of the cloth. The edges of the cloth are folded up and lapped over the top of the uncured rubber, thereby creating a "sock" entirely surrounding the uncured rubber and faced on the tread side with polyethylene film. The male mold tire, film, sock and rubber structure is then enclosed in an envelope, and the uncured rubber is cured by application of heat and pressure in a chamber in accordance with the teaching of my patent U.S. Pat. No. 4,269,644.

After removal from the male mold tire, the fabric and rubber female tread mold thus produced may be utilized to retread a previously prepared tire carcass by first coating the buffed crown of the carcass with cement and then applying a layer of uncured rubber. A sheet of thin, perforated polyethylene film is placed between the uncured rubber and the mold, and the mold is placed around the tire on top of the uncured tread rubber previously applied. The assembly is then placed inside a curing envelope like the one disclosed in my patent U.S. Pat. No. 4,269,644, and curing of the tread rubber is accomplished in accordance with the teaching of my prior patent for curing the bond between the tire carcass and precured tread by application of pressure and heat in a chamber. The pressure resulting when the envelope is evacuated to the atmosphere and the pressure within the curing chamber forces the envelope against the tread mold, which is in turn forced against and into the uncured rubber. The cloth face of the mold and polyethylene film allow the sidewall-forming portions of the mold to slide against the corresponding areas of the tire carcass thereby permitting the mold fully to seat against the uncured rubber and tire carcasses. The cloth which forms the surface of the tread mold also "wicks" or "bleeds" air and gases out of the recapped tread pattern being formed. Curing at relatively lower temperatures (less than 212° F.) permits the tread rubber to conform to the tread mold and fully form a tread design before it stops flowing as a result of curing, and such low temperatures do not damage the tire casing or carcass or turn moisture in the carcass to steam which would expand and damage the casing by causing separations within it. Curing in accordance with the present invention can, however, be accomplished at temperatures up to approximately 260° F.

Utilization of the highly stretchable cloth as a mold surface and use of polyethylene film in accordance with the present invention thus achieves several advantages, particularly including the following:

1. Trapped air and all gases evolved during curing are vented from the mold, thereby avoiding problems which arise when such gases are not fully vented, including incomplete tread curing and excess tread porosity, which creates wear and bonding problems.

2. Treads formed utilizing the mold of the present invention form properly and cure fully.

3. The cloth face of the mold substantially extends mold life because the cloth face wears better than a rubber surface.

4. It is substantially easier to release the mold of the present invention from treads formed in it than from a mold having a rubber face.

5. Unlike loose strings or a loosely woven fabric network of strands utilized as a venting material, the cloth utilized in accordance with the present invention does not fragment or fall out of the mold during use.

6. Extension of the cloth entirely around the mold eliminates the need for utilization of a canvas liner when producing the mold or utilizing it to recap tires because, like a liner, the cloth "bleeds" or "wicks" air and gases in the vicinity of the envelope valve. The cloth also wicks out air and gases from the entire mold inside and outside surfaces during curing of the mold and prevents clogging and imprinting of the envelope valve in the outside surface of the mold during both mold formation and during recapping.

7. Side forming portions of the mold slide in contact with the tire carcass permitting the mold fully to seat on the carcass and uncured rubber during recapping.

Accordingly, an object of the present invention is to provide an improved flexible mold which produces superior recap treads and has a long service life.

A further object of the present invention is the provision of a economical system for producing custom molds to provide the capability of recapping tire carcasses with any desired tread design or configuration.

An additional object of the present invention is to provide a highly functional, inexpensive system for producing an improved flexible mold and utilizing it to retread tires in a "cold" recapping procedure which produces superior recapped tires.

DETAILED DESCRIPTION OF THE DRAWINGS

Figure 1:
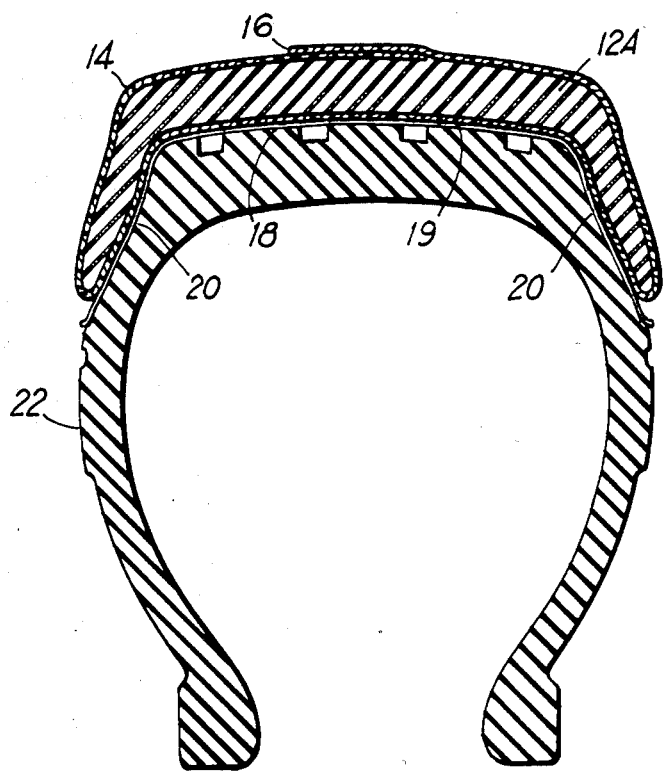
FIG. 1 is a cross-section of a male mold, shown as a tire of appropriate size and having a desired tread pattern covered with a sheet of plastic film, with the mold forming layer of uncured rubber shown surrounded by a layer of venting cloth, the edges of which lap on the outside thereof.

FIG. 1 illustrates the relationship of elements required for production of the female recapping mold of the present invention. A layer of uncured rubber 12A enclosed in a sock 14 of highly stretchable synthetic cloth 16 is positioned on the tread 18 and selected sidewall portions 20 of male mold 22 and separated from male mold 22 by a thin sheet of perforated plastic film 19, such as polyethylene film. Male mold 22 is typically a new tire of appropriate size and having the desired tread 18 pattern and transverse contour desired for the recapped tread to be produced. A specific type of cloth 16 which has been shown to achieve the unexpected results of the present invention is a stretchable material known in the tire recapping industry as "wicking material" which is apparently produced by knitting polyester thread around parallel strands of elastic rubber.

The assembly shown in FIG. 1 is prepared by building up a layer of uncured rubber 12A on the tread area 18 of male mold 22. Layer 12A is then temporarily removed from male mold 22. A thin sheet of perforated polyethylene film 19 is positioned on male mold 22, and the layer of uncured rubber 12A is wrapped with a strip of cloth 16 at least twice as wide as layer 12A. Cloth 16 is positioned on the inside surface of layer 12A, or cloth 16 is positioned on the tread 18 of male mold 22 and layer 12A is positioned on cloth 16, and the edges of cloth 16 are folded over the outer surface of layer 12A such that those edges overlap at any convenient location on the outside of layer 12A. When assembly is complete, the rubber 12A and cloth 16 structure which will become the female mold are positioned around male mold 22 as shown in FIG. 1.

Figure 2:
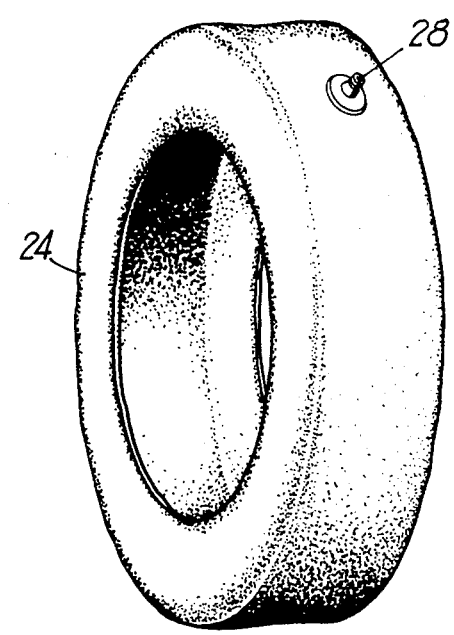
FIG. 2 is a perspective view of one of the envelopes utilized to enclose mold components and male mold tires during tread mold production, or tread molds and tire carcasses during retreading, in accordance with the present invention.

Male mold 22, uncured rubber 12A, sock 14 and film 19 positioned as shown in FIG. 1 may then be enclosed in an envelope 24 as shown in FIG. 2. Two or more such assemblies are then placed in side by side relationship as disclosed in my patent U.S. Pat. No. 4,269,644, which is incorporated in its entirety herein by reference, and curing of the uncured rubber layer 12A is accomplished in accordance with the teaching of that patent for curing the rubber bonding composition between the precured tread strip and prepared tire carcass disclosed therein. Alternatively, curing may be accomplished by other appropriate procedures which apply pressure and heat as required. The advantage of avoiding conversion of any moisture present into steam is achieved by curing at temperatures lower than 212° F., but curing of rubber layer 12A may be accomplished at temperatures up to approximately 260° F. with appropriate adjustment of the length of the curing time.

Figure 3:
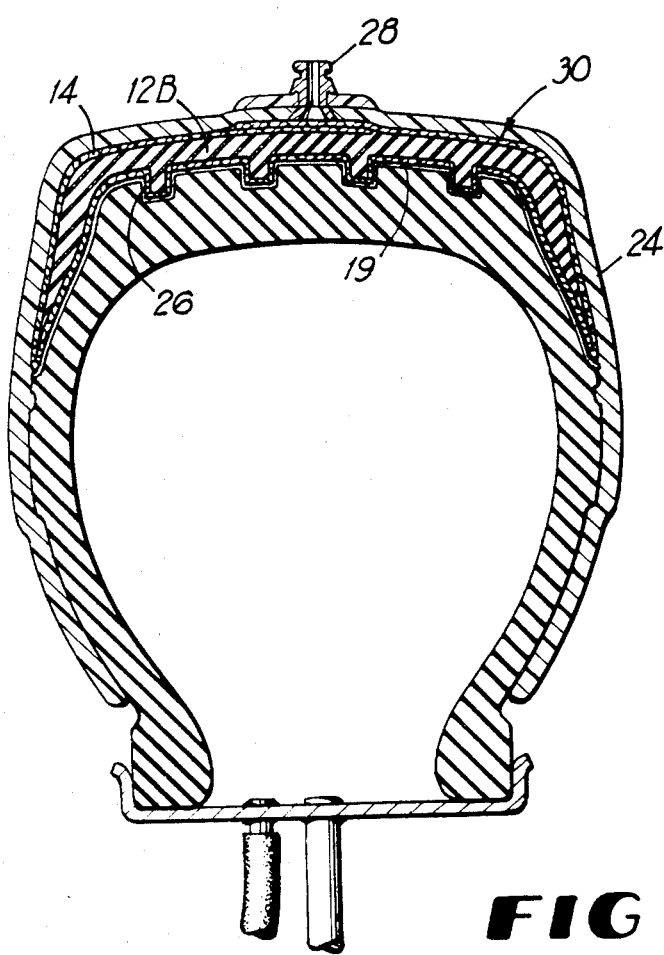
FIG. 3 is a section like FIG. 1 showing the tread mold being cured within the envelope shown in FIG. 2.

Referring now to FIG. 3, application of pressure during curing forces the cloth 16 and layer of uncured rubber 12A (shown in FIG. 1) down into the grooves 26 of male mold 22, and a cured layer of rubber 12B forms which conforms to the shape of male mold 22 and has a surface formed by the sock 14 and film 19. The highly stretchable cloth 16 utilized for sock 14 is forced down into the grooves 26 by layer 12B and readily adapts to all contours of male mold 22. Because the cloth of sock 14 is a highly effective wicking material permitting passage of gases and air out of the area of interface between male mold 22 and sock 14, and because sock 14 conforms to the convolutions of male mold 22, sock 14 is highly effective in permitting venting of such gases and air. Additionally, the layer or layers of cloth 16 forming sock 14 on the outside of rubber layer 12B serve to facilitate passage of air and gases into a valve 28 in envelope 24 and to prevent imprinting and clogging of valve 28 in rubber layer 12B by pressure on the outside of envelope 24. Such imprinting and clogging would result in an undesirable depression in the female mold 30 being formed and would typically obstruct valve 28, thereby preventing passage of gases and air through it during mold 30 production and when mold 30 is utilized in recapping.

Figure 4:
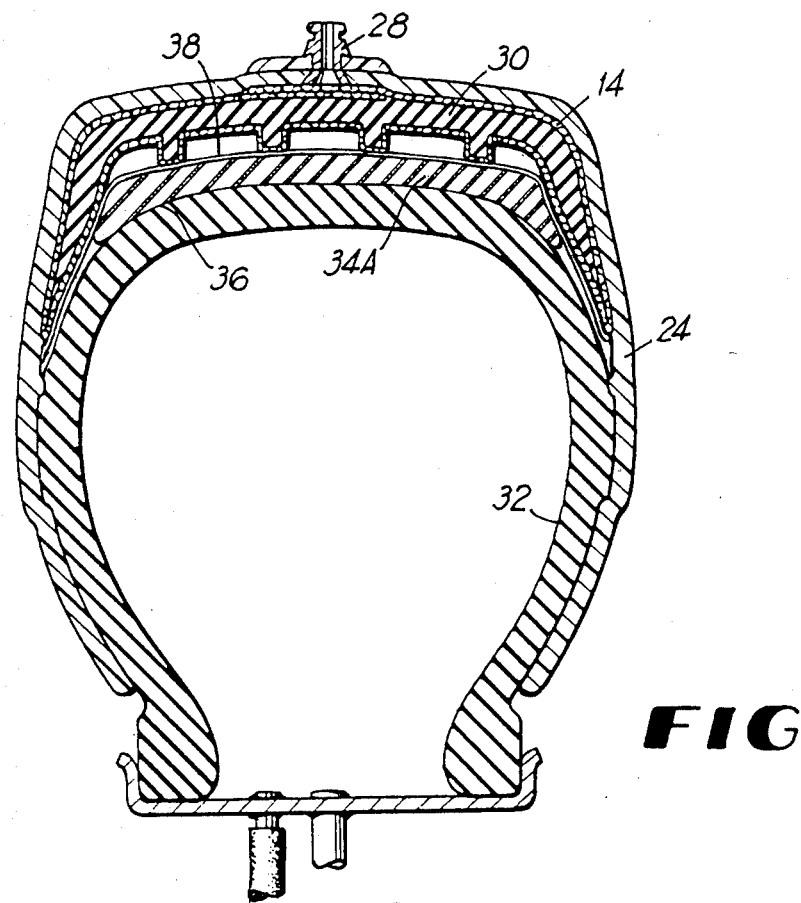
FIG. 4 is a cross-section of the tread mold of the present invention positioned on plastic film on a layer of uncured rubber on a tire carcass and enclosed in an envelope prior to evacuation of the envelope and application of pressure during curing.

FIG. 4 illustrates the relationship of elements assembled for recapping a prepared tire carcass 32 in accordance with the present invention. A layer of uncured rubber 34A which will become the recapped tire 32 tread surface is built up on the prepared tire carcass 32 after coating the buffed crown of carcass 32 with cement 36. A sheet of thin, perforated plastic film 38, such as polyethylene film, is placed between a layer 34A and mold 30 before positioning mold 30 around the tire carcass 32 on top of rubber layer 34A. The mold 30, carcass 32, rubber layer 34A and film 38 assembly is then placed inside a curing envelope 24. Two or more such assemblies are then placed in side by side relationship as disclosed in my patent U.S. Pat. No. 4,269,644, and curing of rubber layer 34A is accomplished in accordance with the teaching of that patent for curing the rubber bonding composition between the precured tread strip and prepared tire carcass disclosed therein or by means of any other appropriate curing procedure which applies heat and pressure as required. As noted above, the advantage of avoiding conversion of moisture to steam is achieved by curing at temperatures lower than 212° F., but curing of rubber layer 34A may be accomplished at temperatures up to approximately 260° F. with appropriate adjustment of the length of the curing time.

Figure 5:
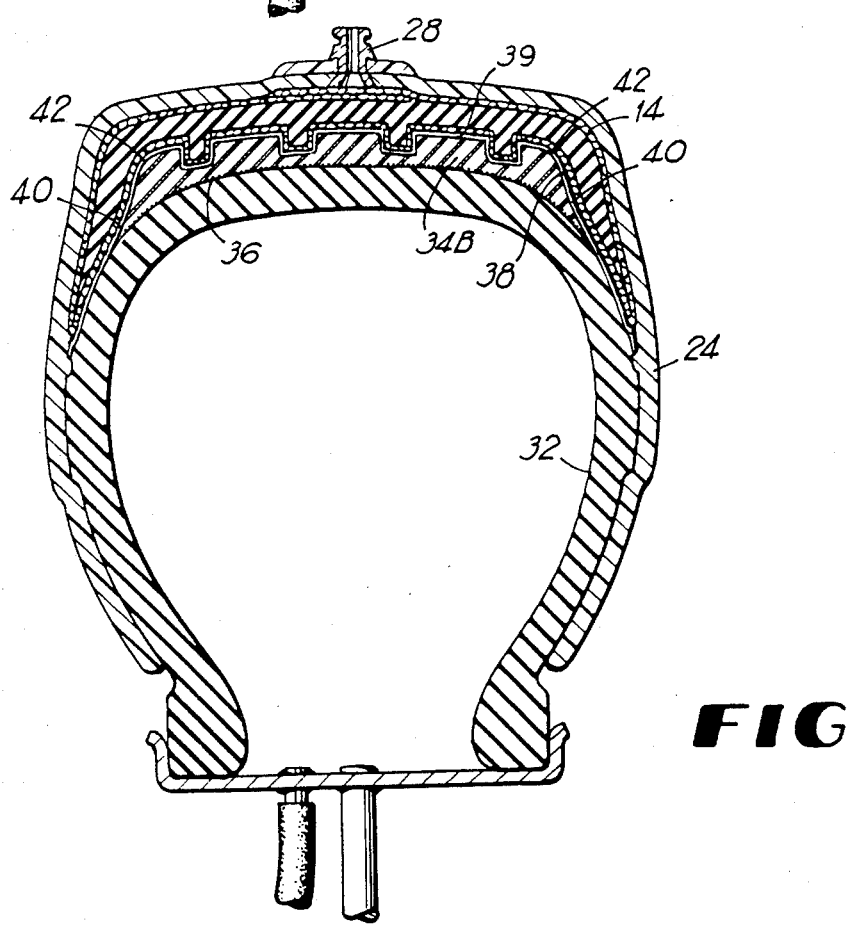
FIG. 5 is a partial cross-section of the components shown in FIG. 4 after evacuation and pressurization has occurred during curing of the recap tread.

Application of pressure during curing and evacuation of envelope 24 forces mold 30 against layer 34A causing it to conform to the pattern in the face of mold 30, as is illustrated in FIG. 5, thereby forming a cured rubber layer 34B having the desired tread pattern 39 therein. The relatively low friction surfaces presented by cloth 16 face of female mold 30 and plastic film 38 permit relatively free sliding contact between mold 30 and rubber layer 34B in sidewall areas 40, thereby permitting mold 30 fully to seat on layer 34B, including the "corners" 42 of mold 30 which frequently do not seat fully in prior art molds.

The cloth 16 face of mold 30 and film 38 also permit relatively easy removal of mold 30 from cured rubber retread layer 34B of tire 32 after completion of the curing cycle. Film 38 typically molds into and adheres to the finished surface of tread 39, imparting a shiny appearance thereto; accordingly, no film 38 removal step is required after completion of the curing cycle.

Although the present invention is described and illustrated with detailed reference to the preferred embodiment, the invention is not intended to be limited to the details of such embodiment, but includes numerous modifications and changes thereto while still falling within the intent and spirit hereof.

I claim:

1. A cold tire recapping method utilizing uncured rubber and a prepared tire carcass comprising the steps of:

selecting a male mold that has the transverse contour wanted for the tread of the recapped tire and selected sidewall portions for the recapped tire and has the desired design and dimensions therefor, building up on the male mold tread and selected sidewall portions a first layer of uncured rubber having cross-sectional dimensions appropriate for forming the tread and sidewall portions of the recapped tire, removing the first layer from the male mold and wrapping the male mold tread and selected sidewall portions with perforated plastic film, positioning a rectangle of stretchable cloth between the first layer and the film-covered male mold tread, the cloth dimensioned larger than the desired tread and sidewall portions of the recapped tire such that the longer opposing edges of the cloth fold over the top of the first layer and overlap, molding the first layer and cloth against the male mold with heat and pressure for a period sufficient to mold and to cure the rubber in the first layer and secure the cloth to the entire surface thereof while simultaneously permitting air trapped between the first layer and the male mold and gases evolved from the first layer during curing to escape through the cloth, the cured first layer and cloth forming a flexible female mold with a cloth surface partially faced with plastic film, removing the flexible female mold, coating the buffed surface of the prepared tire carcass with an adhesive cement, placing a second layer of uncured rubber on the buffed surface of the prepared tire carcass, placing the female mold around the buffed tire carcass, placing the tire carcass, cement, second layer, and female mold assembly in a flexible envelope, and curing the second layer by applying heat and forcing the female mold against the second layer while venting the inner portion of the envelope to atmospheric pressure to allow gases trapped within the envelope to escape.

2. A cold tire recapping method utilizing uncured rubber and a prepared tire carcass comprising the steps of:

selecting a male mold that has the transverse contour wanted for the tread of the recapped tire and selected sidewall portions for the recapped tire and has the desired design and dimensions therefor, forming a first layer of uncured rubber having cross-sectional dimensions appropriate for forming the tread and selected sidewall portions of the recapped tire, wrapping the male mold tread and selected sidewall portions thereof with a perforated plastic film, positioning a rectangle of stretchable cloth between the first layer and the film covered male mold tread, the rectangle of cloth dimensioned larger than the first layer and folding the opposing edges of the cloth over the top of the first layer and overlapping the edges of the cloth, molding the first layer and cloth against the male mold with heat and pressure for a period sufficient to mold and to cure the rubber in the first layer and secure the cloth to the entire surface thereof while simultaneously permitting air trapped between the first layer and the male mold and gases evolved from the first layer during curing to escape through the cloth, removing the cured first layer and cloth as an elastic, flexible female mold with a cloth surface partially faced with plastic film, coating the buffed surface of the prepared tire carcass with adhesive cement, placing a second layer of uncured rubber on the buffed surface of the prepared tire carcass, disposing a layer of perforated plastic film on the second layer, placing the female mold around the buffed tire carcass and the second layer with the layer of film disposed therebetween, and molding the second layer against the tire carcass and bonding it thereto with heat and pressure for a period sufficient to mold and cure the second layer and cement while permitting air trapped between the second layer and the female mold and gases evolved from the layer during curing to escape through the cloth.

3. A method for producing a mold for use in recapping a prepared tire carcass comprising the steps of:

selecting a male mold that has the transverse contour wanted for the tread of the recapped tire and selected sidewall portions for the recapped tire and has the desired design and dimensions therefor, forming a layer of uncured rubber having cross-sectional dimensions appropriate for forming the tread and selected sidewall portions of the recapped tire, wrapping the tread and selected sidewall portions on the male mold with perforated plastic film, positioning a rectangle of stretchable cloth between the layer and the plastic film covered male mold tread, the cloth dimensioned larger than the first layer such that it can be wrapped thereabout and folding the opposing edges of the cloth over the top of the layer and overlapping the edges, and molding the layer and cloth against the male mold with heat and pressure for a period sufficient to mold and cure the rubber and secure the cloth to the entire surface thereof while simultaneously permitting air trapped between the layer and the male mold and gases evolved from the layer during curing to escape through the cloth.

4. A method for forming a tire recapping mold and recapping a prepared tire carcass, comprising:

disposing a first layer of uncured rubber on a male mold tire having the desired profile of the recapped tire;

disposing a layer of wicking material around the first layer of uncured rubber;

disposing a layer of film between the surface of the male mold tire and the combined first layer of uncured rubber and layer of wicking material;

conforming the first layer of uncured rubber with the layer of wicking material therearound to the profile of the male mold tire and simultaneously curing the first layer of uncured rubber to form the tire recapping mold such that the portion of the layer of wicking material adjacent the surface of the male mold tire conforms to the entire tread pattern and transverse contour thereof;

removing the recapping mold from the male mold tire with the outer surface thereof having the layer of wicking material attached thereto;

disposing a second layer of uncured rubber adjacent the surface of the carcass with a layer of adhesive material therebetween;

disposing the recapping mold about the combined carcass and second uncured rubber layer with the tread pattern adjacent the second uncured rubber layer;

disposing a layer of film between the second layer of uncured rubber and the recapping mold to prevent adhesion therebetween; and curing the second layer of uncured rubber while simultaneously forcing the tread pattern of the recapping mold against the second layer of uncured rubber to impress the tread pattern profile therein to yield the profile of the male mold tire in the second layer of uncured rubber upon curing thereof, the layer of wicking material disposed about the recapping mold allowing venting of gases from between the recapping mold and second layer of uncured rubber during curing thereof.

5. The method of claim 4 wherein the first layer of uncured rubber is disposed about the surface on the male mold tire to cover the tread in the male mold tire and the sidewalls thereof.

6. The method of claim 4 wherein the step of conforming the first layer of uncured rubber comprises placing the male mold tire with the layer of wicking material and the first layer of uncured rubber into a curing envelope and then evacuating the envelope to force the combined first layer of uncured rubber and wicking material against the surface of the male mold tire such that the layer of wicking material proximate the surface of the male mold tire and the first layer of uncured rubber conforms to the profile on the surface of the male mold tire.

7. The method of claim 4 wherein the step of curing the second layer of uncured rubber comprises disposing the recapping mold, the second layer of uncured rubber and the carcass into a curing envelope and then evacuating the envelope to force the mold against the surface of the second layer of uncured rubber while simultaneously applying heat and pressure to cure the second layer of uncured rubber.

8. A method for forming a tire recapping mold and recapping a prepared tire carcass, comprising:

wrapping a layer of uncured rubber with a layer of wicking material;

disposing the wrapped layer on a male mold tire adjacent the tread and sidewalls thereof;

curing the wrapped layer to form the tire recapping mold having an interior contour molded to a tread and sidewall-forming shape such that the wicking layer conforms to the profile of the male mold tire and forms the entire surface of the recapping mold; and recapping the prepared tire carcass utilizing the recapping mold.

9. A method for forming a tire recapping mold and recapping a prepared tire carcass, comprising:
- wrapping a layer of uncured rubber with a layer of wicking material;
- disposing the wrapped layer on a male mold tire adjacent the tread and sidewalls thereof;
- curing the wrapped layer to form the tire recapping mold having an interior contour molded to a tread and sidewall-forming shape such that the wicking layer conforms to the profile of the male mold tire and forms the entire surface of the recapping mold;
- disposing a layer of uncured rubber adjacent a prepared tire carcass;
- disposing the recapping mold adjacent the outer surface of the layer of uncured rubber disposed adjacent the carcass; and
- curing the layer of uncured rubber and simultaneously forcing the recapping mold thereagainst to impress the tread and sidewall-forming shape of the recapping mold therein upon curing thereof, the wicking material wrapped about and integral with the surface of the recapping mold allowing for venting of gases during curing.

10. An apparatus for forming a tire recapping mold and recapping a prepared tire carcass, comprising: p1 means for wrapping a layer of uncured rubber with a layer of wicking material;
- means for disposing said wrapped layer on a male mold tire adjacent the tread and sidewalls thereof;
- means for curing said wrapped layer to form the tire recapping mold having an interior contour molded to a tread and sidewall-forming shape such that said wicking layer conforms to the profile of the male mold tire and forms the entire surface of the recapping mold; and
- means for recapping the prepared tire carcass utilizing the recapping mold.

11. A method for recapping a prepared tire carcass, comprising:
- disposing a layer of uncured rubber around a prepared tire carcass;
- disposing a female mold having the contour of the desired tread and sidewalls adjacent the prepared tire carcass with the layer of uncured rubber, the female mold having a layer of wicking material disposed therearound and conforming with the mold contour and forming the entire surface of the female mold; and
- curing the layer of uncured rubber while forcing the mold against the layer of uncured rubber on the prepared carcass.

* * * * *